US008030791B2

(12) United States Patent
Lang et al.

(10) Patent No.: US 8,030,791 B2
(45) Date of Patent: Oct. 4, 2011

(54) CURRENT SOURCE CONVERTER-BASED WIND ENERGY SYSTEM

(75) Inventors: Yongqiang Lang, Ontario (CA); Navid Reza Zargari, Cambridge (CN); Manish Pande, Cambridge (CA); Bin Wu, Toronto (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 638 days.

(21) Appl. No.: 12/183,816

(22) Filed: Jul. 31, 2008

(65) Prior Publication Data
US 2010/0025995 A1 Feb. 4, 2010

(51) Int. Cl.
*F03D 9/00* (2006.01)
*H02P 9/04* (2006.01)
(52) U.S. Cl. ................ 290/44; 290/43; 322/37
(58) Field of Classification Search .............. 290/7, 43, 290/44, 54, 55; 322/24, 37
See application file for complete search history.

(56) References Cited

U.S. PATENT DOCUMENTS

| | | |
|---|---|---|
| 3,757,197 A | 9/1973 | Bailey |
| 4,276,589 A | 6/1981 | Okawa et al. |
| 4,496,899 A | 1/1985 | Lippitt et al. |
| 4,545,002 A | 10/1985 | Walker |
| 4,833,389 A | 5/1989 | Kovalsky et al. |
| 4,870,338 A | 9/1989 | Abbondanti |
| 5,005,115 A | 4/1991 | Schauder |
| 5,041,959 A | 8/1991 | Walker |
| 5,083,039 A * | 1/1992 | Richardson et al. ........... 290/44 |
| 5,798,632 A * | 8/1998 | Muljadi ........................ 322/29 |
| 6,166,929 A | 12/2000 | Ma et al. |
| 7,312,537 B1 * | 12/2007 | Walling et al. ................ 290/44 |
| 7,432,686 B2 * | 10/2008 | Erdman et al. ................ 322/44 |
| 7,462,946 B2 * | 12/2008 | Wobben ........................ 290/44 |
| 7,511,385 B2 * | 3/2009 | Jones et al. .................... 290/43 |
| 7,595,563 B2 * | 9/2009 | Wobben ........................ 290/44 |
| 7,656,052 B2 * | 2/2010 | Jones et al. .................... 290/43 |
| 7,663,260 B2 * | 2/2010 | Kabatzke et al. .............. 290/44 |
| 7,679,208 B1 * | 3/2010 | Ko et al. ........................ 290/44 |
| 7,692,321 B2 * | 4/2010 | Jones et al. .................... 290/43 |
| 7,692,325 B2 * | 4/2010 | Ichinose et al. ................ 290/44 |
| 7,755,209 B2 * | 7/2010 | Jones et al. .................... 290/44 |
| 7,816,798 B2 * | 10/2010 | Hehenberger ................. 290/44 |
| 2006/0232250 A1 | 10/2006 | Sihler et al. |
| 2011/0057444 A1 * | 3/2011 | Dai et al. ....................... 290/44 |

* cited by examiner

*Primary Examiner* — Nicholas Ponomarenko
(74) *Attorney, Agent, or Firm* — Fay Sharpe LLP; Alexander R. Kuszewski; John M. Miller

(57) ABSTRACT

Power conversion apparatus and methods are presented for providing electrical power to a grid or other load in which a synchronous machine is driven by a wind turbine or other prime mover to provide generator power to a switching type current source converter (CSC), with a current source rectifier (CSR) of the CSC being switched to provide d-axis control of the synchronous machine current based on grid power factor feedback, and with a current source inverter (CSI) of the CSC being switched to provide leading firing angle control and selective employment of dumping resists to dissipate excess generator energy in a fault mode when a grid voltage drops below a predetermined level.

22 Claims, 10 Drawing Sheets

US 8,030,791 B2

CURRENT SOURCE CONVERTER-BASED WIND ENERGY SYSTEM

FIELD OF THE INVENTION

The present invention relates generally to electrical power conversion and more particularly to current source converter-based wind energy systems.

BACKGROUND OF THE INVENTION

Wind energy is currently a fast growing power generation technology, and ongoing development is directed to providing wind-generated power to electrical power grids. Power conversion systems are needed to adapt the power generated by the wind turbines to AC electric power in a form compatible with the power grid. One type of conversion apparatus is a current source converter (CSC) that includes a current source rectifier (CSR) and a current source inverter (CSI, also known as a current controlled inverter). Conventional wind energy systems (WES) typically do not employ current source converters, due to the difficulties in controlling output reactive power to the grid, as the CSC systems require large filter capacitors at the output and hence usually has a leading power factor, particularly during low speed operation. Moreover, wind energy system power converters must be adaptable to grid fault conditions, such as where the grid voltage deteriorates, while interfacing with the wind-driven generator. Accordingly, there is a need for improved wind energy systems by which energy derived from wind-driven machines can be converted for supplying electrical power to a grid.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The present disclosure presents power conversion systems and current source converters and switching controls thereof by which wind energy and other systems may successfully provide reactive power control and grid fault tolerance while employing current source converter technology.

In accordance with one or more aspects of the present disclosure, current source converters are provided for conversion of input electrical power to output electrical power, which include a switching type current source rectifier (CSR), a switching type current source inverter (CSI), and a switch control system that provides control signals to the CSR to convert input power to intermediate DC using selective adjustment of the d-axis current of a synchronous machine driving the rectifier so as to regulate the output grid power factor. The converter may operate to provide switching control signals to the CSI to control an output current to be at a leading angle relative to the grid voltage in a fault mode when the grid voltage falls below a predetermined value, and the converter may include at least one resistor and at least one switch selectively operable to couple the resistor to an intermediate DC link circuit or the CSC input to dissipate excess power in the fault mode. The disclosure may thus be employed to provide wind energy system solutions using CSC-based power conversion while addressing reactive power control and fault operation considerations.

Further aspects of the disclosure are directed to a power conversion system for providing electrical power to a grid that is comprised of a synchronous machine with a rotor adapted to be driven by a wind turbine or other prime mover and a generator output providing multiphase electrical output power when the rotor is driven, as well as a CSC for converting input electrical power to output electrical power. In certain embodiments, the synchronous machine generating the input power is a permanent magnet synchronous generator (PMSG) that includes a permanent magnet rotor. The CSC includes an input operatively coupled with the generator output of the synchronous machine to receive input electrical power from the generator output, an output for providing output electrical power to a power grid, an intermediate circuit with at least one storage element, a switching type CSR, and a switching type CSI. The CSC also includes a feedback system to provide feedback values or signals indicating one or more electrical conditions at the output, as well as a switch control system that provides pulse width modulated (PWM) CSR switching control signals with firing angle control to the CSR to convert input power from the synchronous machine to intermediate DC in the intermediate circuit, with the switch control system providing the CSR switching control signals to selectively adjust a d-axis current of the synchronous machine to regulate power factor of the output according to the at least one feedback value or signal. The CSC in certain embodiments operates during grid fault conditions to providing leading firing angle output control of the CSI, and may also include one or more resistors and switches to couple the resistor(s) to an intermediate DC link circuit or the CSC input to dissipate excess power in the fault mode.

Other aspects of the present disclosure relate to a switch control system that provides PWM switching control signals with firing angle control to a CSC in a power conversion system. The control system includes a d-axis stator current control component which provides switching control signals to a CSR of the CSC to convert input power from a synchronous machine to intermediate DC and to selectively adjust a d-axis current of the synchronous machine to regulate power factor of the CSC output according to one or more grid-side output feedback signals or values. The control system may further include a feedback system that senses a grid voltage and provides a fault mode signal when the grid voltage is below a predetermined value, along with one or more resistors and switches to couple the resistor(s) an intermediate circuit and/or to the CSC input in order to dissipate excess power in the fault mode.

Further aspects of the disclosure provide a current source converter for converting input electrical power to output electrical power. The converter includes a switching type CSR to convert input power to an intermediate DC, and a switching type CSI to convert the intermediate DC to multiphase AC output power, as well as a switching control system that provides switching control signals to the CSI and CSR. The converter also includes a feedback system providing one or more feedback values and/or signals indicating output electrical conditions and sensing the grid voltage to provide a fault mode signal when the grid voltage is below a predetermined value. The CSC also comprises one or more resistors and switches to couple the resistor(s) to the intermediate DC circuit and/or to the CSC input in order to dissipate excess power in the fault mode.

Still other aspects of the disclosure provide a power conversion system that includes a synchronous machine providing multiphase electrical output power, and a CSC that converts power from the synchronous machine to output electrical power, where the CSC includes at least one resistor and a switch to selectively couple the resistor to a CSC intermediate DC circuit and/or to the CSC input in order to dissipate excess power in the fault mode.

Further aspects of the disclosure relate to a switch control system for providing pulse width modulated switching control signals with firing angle control for controlling a current source converter (CSC) in a power conversion system providing electrical power to a grid. The switch control system comprises a feedback system operative to sense a grid voltage and to provide a fault mode signal when the grid voltage is below a predetermined value, at least one resistor, and at least one switch selectively operable according to the fault mode signal to couple the at least one resistor to one of an intermediate circuit and an input of the CSC to dissipate excess power in the fault mode.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings in which.

DETAILED DESCRIPTION OF THE INVENTION

Figure 1:
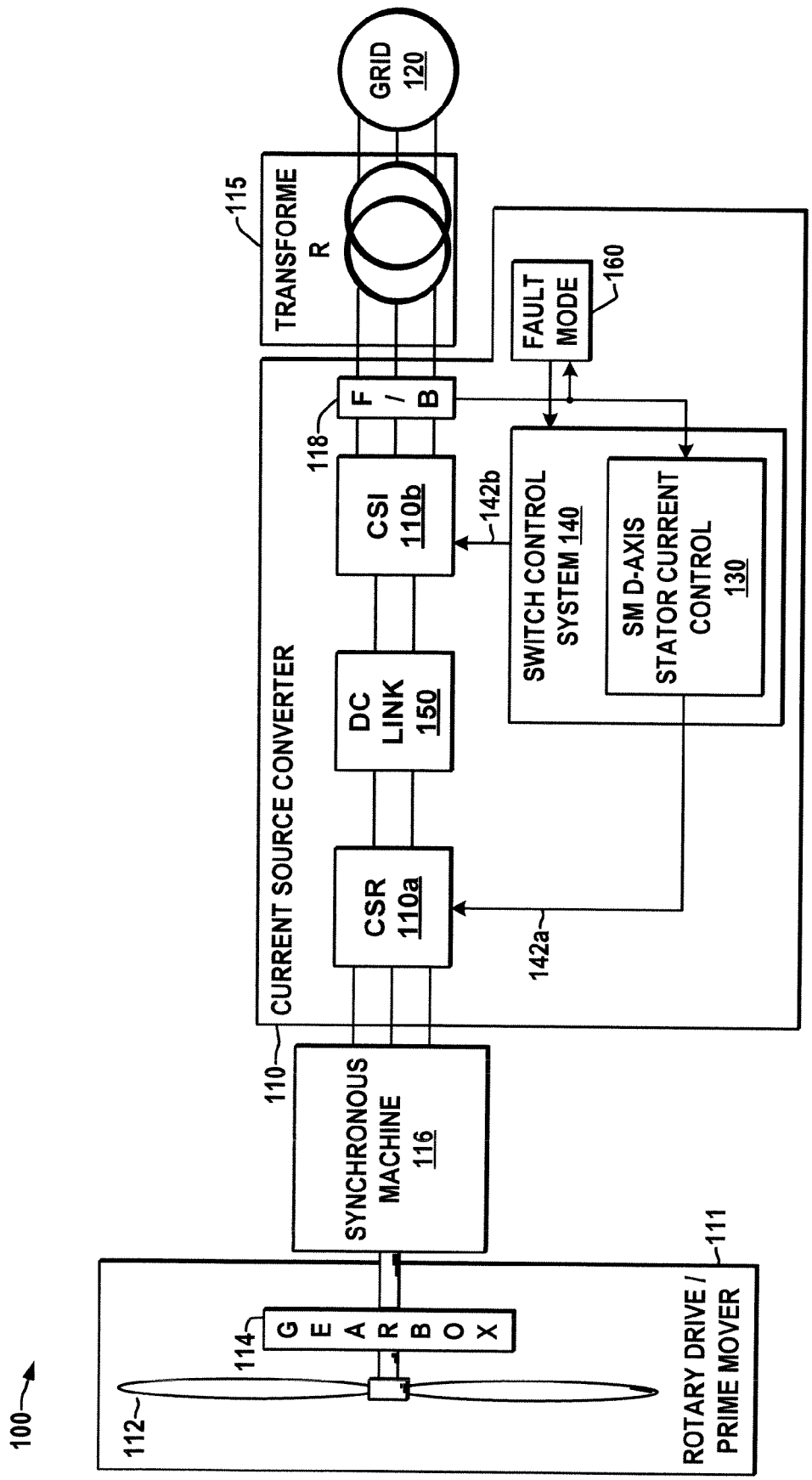
FIG. 1 is a schematic diagram illustrating an exemplary current source converter-based wind energy power conversion system with a synchronous generator and a switch control system having a d-axis control component for grid-side power factor correction and fault mode operation in accordance with one or more aspects of the present disclosure.

Referring now to the figures, several embodiments or implementations of the present invention are hereinafter described in conjunction with the drawings, wherein like reference numerals are used to refer to like elements throughout, and wherein the various features are not necessarily drawn to scale.

Figure 2:
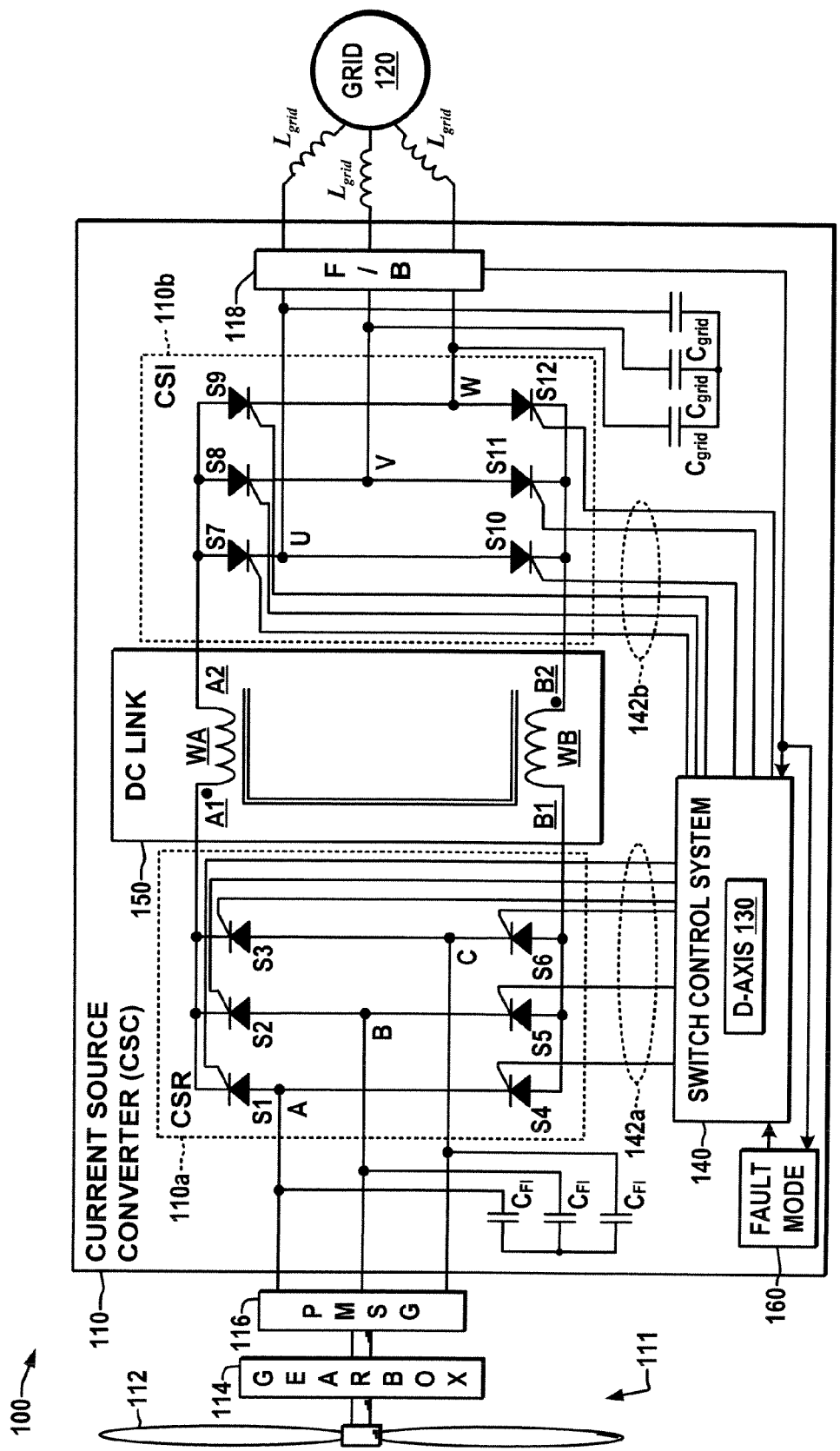
FIG. 2 is a schematic diagram illustrating further details of the CSC-based system of FIG. 1.

FIGS. 1 and 2 illustrate an exemplary wind energy converter (WEC) or wind energy system (WES) 100 in accordance with the present disclosure, in which a current source converter (CSC) 110 is connected to an AC power source derived from a wind-receiving rotary propeller 112 operatively coupled with a synchronous machine, in one example, a permanent magnet synchronous generator (PMSG) 116 operating in this case as a generator with a permanent magnet rotor. The system 100 may optionally include a gearbox 114 operatively coupled between the propeller 112 and the PMSG 116, although not a strict requirement of the present disclosure. The PMSG 116 converts rotational mechanical energy from the propeller 112 into single or multi-phase AC electrical power, which is provided as a machine-side or generator-side power input to the CSC 110, and the CSC 110 provides a grid-side power output in the form of multi-phase AC electrical power to a grid 120. The CSC 110 converts input (machine-side) power to output (grid-side) power, and includes a current source rectifier (CSR) 110a that converts the input AC electrical power to DC to feed a DC link intermediate circuit 150 with at least one storage element, such as a DC choke in one example. A current source inverter (CSI) 110b generates the AC power output to the grid 120 derived from the DC link 150. As shown in FIG. 1, the exemplary system 100 includes an optional step-up transformer 115, for example, to step the output voltage (e.g., about 6 KV in one example) up to about 30 KV for the grid 120, and also to provide isolation between the converter 110 and the grid load 120. As shown best in FIG. 2, the CSR 110a and the CS 110b are switch-based converters including electrical switching devices S1-S6 and S7-S12, respectively, which can be any suitable form of electrical switches, including without limitation IGCTs, GTOs, IGBTs, FETs, etc. The switching-type converters 110a and 110b in one embodiment operate under control of a switch control system 140, although separate switching control systems may be employed, for example, with interconnections and information sharing to facilitate the coordinated operation of the CSR 110a and the CSI 110b.

In accordance with one or more aspects of the disclosure, moreover, the CSC 110 also includes a d-axis control 130 providing control of d-axis current in the PMSG 116, and a fault mode control 160 for modifying the operation of the converter 110 during fault conditions on the grid 120. The machine side rectifier 110a and the grid-side inverter 110b are operated by the switch control system 140 for conversion of input wind power to grid power. Although illustrated in the context of a three-phase electrical conversion system 110, the various power conversion aspects of the present disclosure may be advantageously employed in association with single-phase implementations, as well as multi-phase systems having three or more power lines as input (from a PMSG) and/or output (to a grid). Moreover, the converter 110 may be employed in connection with other forms of input generators 116 and is not limited to permanent magnet synchronous type generators 116. The system 100 and the converter 110 thereof, moreover, may be operated at any suitable input and output frequencies, for example, wherein the frequency of the input power received from the PMSG 116 may vary with the speed of the wind and the converter 110 is adaptable to provide AC electrical power of any desired output frequency to the grid 120.

In addition, while illustrated and described in the context of a wind energy system 100, the various aspects of the present disclosure, including the d-axis current control of the synchronous machine for grid-side power factor correction/control can be implemented in association with other forms of CSC-type converters. For example, in another embodiment, the converter 110 is employed in a motor drive receiving AC power from the grid 120 (via the CSI 110*b* operating in this case as a switching rectifier) and driving the synchronous motor 116, in which the control system 140 employs d-axis control of the CSR 110*a* (operating in this case as a CSI inverter) to drive the synchronous machine 116 so as to perform grid-side power factor control. In this motor drive configuration, the CSC 110 may also employ selective leading firing angle control, for example, with the switch control system 140 in the CSC-based motor drive being selectively operable to provide the switching control signals 142*b* to the CSI 110*b* to control a current of the CSI to be at a leading angle relative to the grid-side capacitor voltage. The CSC-based motor drive, moreover, may include braking resistors 162 and switches 164 as illustrated and described below in connection with FIGS. 6, 11, and 12, in which one or more switches 164 are selectively operable to couple the braking resistor(s) 162 to one of the intermediate circuit 150 and the output to dissipate excess power, for instance, to facilitating fast stopping of the driven motor 116.

The CSC 110 is operable to convert input electrical power from the input source 116 to output electrical power provided to the power grid 120. In this example, the AC input power is switched by a first set of switches S1-S6 constituting the generator-side converter 110*a* in the form of a switching regulator or CSR to create an intermediate DC bus current in the intermediate circuit 150. The grid-side current source inverter 110*b* comprises a second set of switches S7-S12 forming a CSI switching inverter stage that selectively switches the DC power from the intermediate circuit 150 to provide multiphase AC output power to the grid 120. The intermediate circuit 150 includes a DC choke or inductor linking the switches of the CSR 110*a* and the CSI 110*b* and provides forward and reverse current paths between the converters 110*a* and 110*b*. The inductor of the exemplary intermediate circuit 150 includes a first winding WA in a forward or positive DC path having a first end A1 connected to the upper CSR switches S1-S3 and a second end A2 coupled with the upper CSI switches S7-S9, along with a second winding WB in a negative or return DC path with a first end B1 coupled to the lower CSR switches S4-S6 and a second end B2 coupled to the lower CSI switches S10-S12, although other forms and types of intermediate circuit storage elements may be employed within the scope of the present disclosure.

The switching devices S1-S6 and S7-S12 may be any suitable controllable electrical switch types (e.g., IGCTs, GTOs, thyristors, IGBTs, etc.) that are controlled according to any suitable type or form of switching scheme or schemes, such as phase control, pulse width modulation, etc., in open or closed-loop fashion. In the CSC 110, moreover, CSR switching control signals 142*a* are provided to the individual switches S1-S6 and CSI signals 142*b* are provided to the CSI switches S7-S12 from the switch control system 140 in order to implement a given power conversion task. The switch control system 140 may be provided with one or more set-point desired values and one or more feedback signals or values from a feedback system 118 by which one or more closed loop power conversion goals are achieved in normal operation, and by which the CSC 110 can facilitate operation during grid faults when the grid voltage(s) drops below a predetermined threshold value. In the illustrated embodiments, for example, the switch control system 140 provides inputs for receiving a fault mode signal 160, feedback signals or values from the output feedback system 118, measured input values (e.g., line voltages, currents, etc.), and other information, data, etc., which may be in any suitable form such as an electrical signal, digital data, etc., and which may be received from any suitable source, such as an external network, switches, a user interface associated with the system 100, or other suitable source(s). The switch control system 140 and the d-axis control and other components thereof may be any suitable hardware, software, firmware, logic, or combinations thereof that are adapted to implement the functions illustrated and described herein.

The exemplary CSC 110, moreover, includes input line filter capacitors CFI wye-coupled or delta-coupled to the input nodes A, B, and C in the illustrated embodiment. In addition, the exemplary drive 110 may also include output grid capacitors $C_{grid}$ wye-connected or delta-connected to the output lines U, V, and W, although not a requirement of the present disclosure.

In normal operation, the switching devices S1-S6 of the CSR 110*a* selectively coupled individual ones of the input terminals A, B, and/or C with the intermediate circuit 150 according to a plurality of CSR switching control signals 142*a* so as to convert input multiphase electric power to DC power in the DC link 150, and the CSI switches S7-S12 are operated according to the CSI switching control signals 142*b* to selectively couple the intermediate circuit 150 to the output so as to provide multiphase output power to the grid 120. The feedback system 118 provides one or more feedback values or signals to the control system 140 that are indicative of one or more electrical conditions at the output.

In accordance with one aspect of the present disclosure, the switch control system 140 performs firing angle control (alpha control) in generating pulse width modulated (PWM) CSR switching control signals with firing angle control 142*a* to the CSR 110*a* to convert input power from the synchronous machine 116 to intermediate DC in the intermediate circuit 150. In addition, the switch control system 140 provides the signals 142*a* to selectively adjust a d-axis current of the synchronous machine 116 to regulate power factor of the output according to the at least one feedback value or signal. Thus, the angle control operation of the CSR 110*a* is done so as to implement a grid-side power factor control loop based on power factor feedback from the power output to the grid 120, wherein the switching of the CSR switches S1-S6 affects the d-axis currents of the PMSG 116. In this manner, the CSC 110 provides reactive power control for provision of grid power during normal operation while trading off non-zero d-axis operation of the synchronous machine 116. In the PMSG 116, the d-axis current is the magnetizing component of the synchronous machine stator current, whereas the q-axis current is the torque-producing component.

Conventionally, the d-axis current of the PMSG 116 was controlled to zero in order to optimize the PMSG efficiency. Moreover, conventional motor drive applications of PWM current source converter with firing angle control technology typically does not control the grid side power factor. In wind energy systems 100, however, the turbine propeller 112 drives the PMSG 116 at variable speed, and the CSC 110 must supply power to the grid 120 in a carefully controlled fashion at the corresponding grid voltage and frequency levels. Furthermore, grid operators define grid codes that set the power factor requirements or converters connected to the grid. The inventors have appreciated that adjustment of the PMSG d-axis current affects the DC voltage and the current in the intermediate circuit 150, and reflected to the grid side, this will change the angle of the grid current relative to the grid voltage (power factor angle). The exemplary CSC 110 provides for an exemplary closed-loop grid-side power factor control scheme by adjustment of the PMSG d-axis current (on the generator-side) to control the grid-side power factor through adjustment of the CSR switching signals 142a, by which the CSC may sacrifice PMSG efficiency in order to utilize d-axis current to control grid-side power factor. This aspect of the present disclosure, moreover, is independent of the particular form of synchronous machine 116 driving the CSC, and may be employed, for example, with permanent magnet rotor type machines 116, or with synchronous machines having electrically excited rotor windings, and the synchronous machine 116 may be driven by any form of prime mover 111, such as a wind driven turbine 112 with or without an intermediate gearbox 114, a motor, a gas engine, etc.

Figure 3:
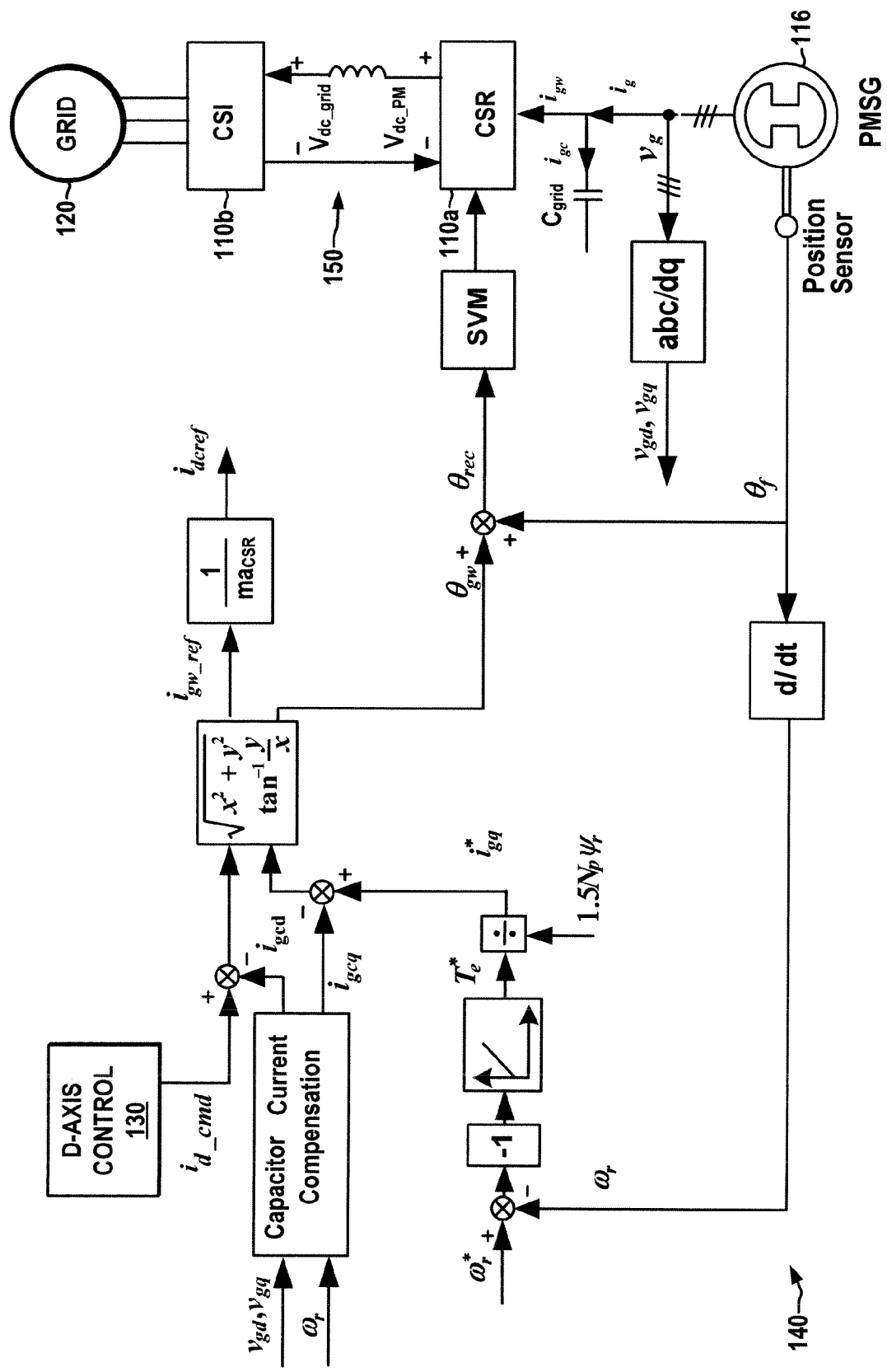
FIG. 3 is a schematic diagram illustrating further CSR control details of the exemplary switch control system in the power converter of FIGS. 1 and 2.
Figure 4:
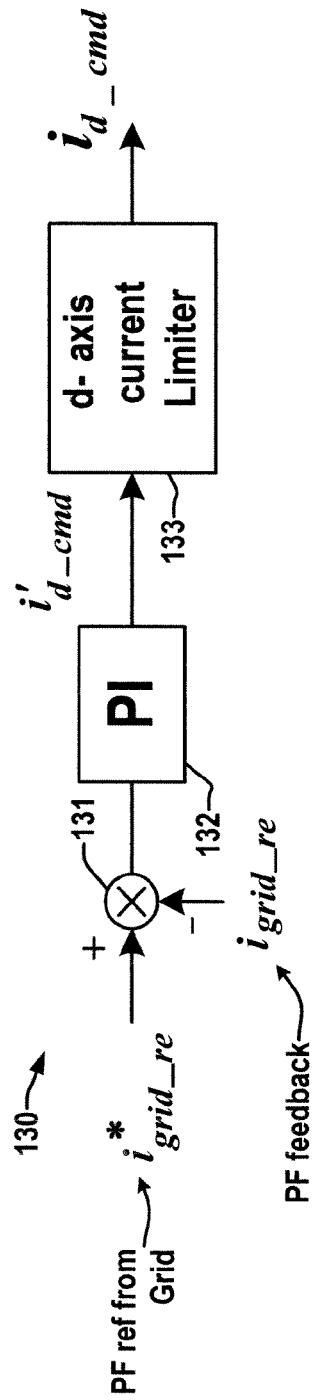
FIGS. 4 and 5 are schematic diagrams illustrating further details of the d-axis control aspects of the switch control system in the power converter of FIGS. 1 and 2.
Figure 5:
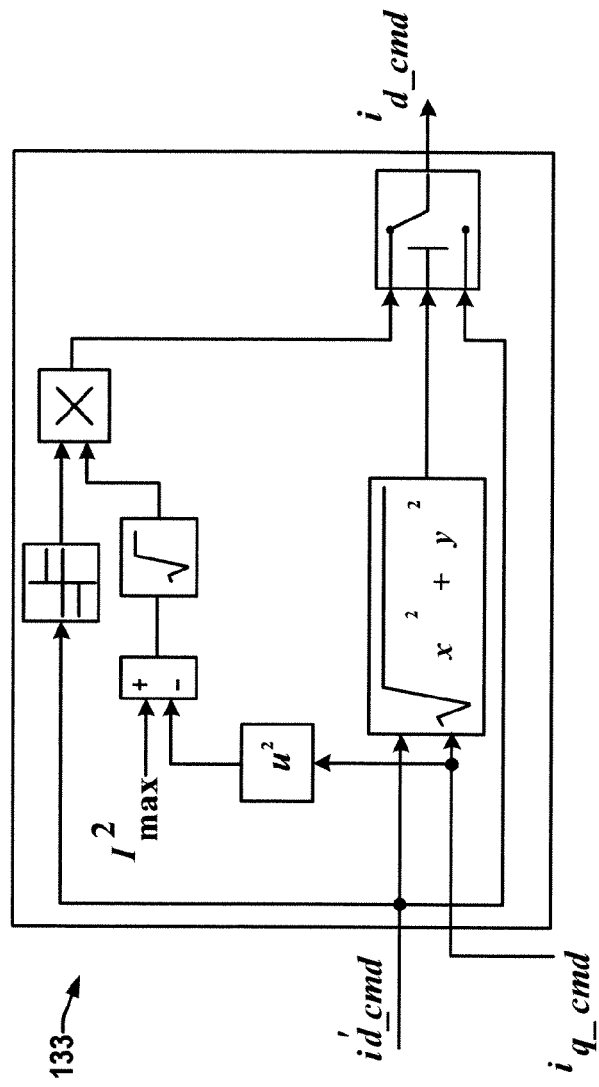

Referring also to FIGS. 3-5, the exemplary switch control system 140 in one embodiment includes a d-axis stator current control component 130 that operates to provide the PWM CSR switching control signals with firing angle control 142a to the CSR 110a to convert input power from the PMSG 116 to intermediate DC in the intermediate circuit 150 and to selectively adjust the PMSG d-axis current to regulate the CSC output power factor according to the output feedback from the system 118. FIG. 3 illustrates CSR-side control details of the control system 140, and FIGS. 4 and 5 show details of the exemplary d-axis control component 130. In the exemplary control system 140, space vector modulation (SVM) switching control with constant modulation index is used for firing angle control, although other forms of pulse width modulation switching techniques with firing angle control can be employed. In the illustrated embodiments, the SVM modulation index is fixed to the maximum value (e.g. unity) and the dc current reference $i_{dcref}$ is equal to the magnitude of the command of the C SR, output current reference $i_{gw\_ref}$ (FIG. 3). As shown in FIGS. 4 and 5, the exemplary d-axis control component 130) provides a comparison of the reactive component of the grid current reference $i^*_{grid\_re}$ calculated according to the reactive power reference (e.g., as set by the grid operator) with its feedback $i_{grid\_re}$ from the feedback system 118 via a summer 131, and the resulting power factor error drives a proportional-integral (PI) control component 132 that generates a raw d-axis command signal $I'_{d\_cmd}$. The exemplary embodiment also provides a d-axis current limiter 133 (FIGS. 4 and 5) which limits the command signal to the limitation value of the stator current (e.g. rated value), and provides a limited signal output $i_{d\_cmd}$.

As shown in FIG. 3, this command signal $i_{d\_cmd}$ is provided by the d-axis control component 130 to compute the CSR output current reference, the magnitude $i_{gw\_ref}$ and the angle $\theta_{gw}$, based on the capacitor current compensation and the q-axis current reference of the generator for speed/torque control in the controller 140. The angle control is performed based on the PMSG rotor position of from which the PMSG rotor speed $\omega_r$ is determined which can be measured by a mechanical position/speed sensor (not shown) or calculated based on the measured voltage and current signals of the generator (e.g. sensorless control). In the case of a PMSG synchronous machine 116, the rotor flux oriented vector control is commonly used for control of the PMSG 116 where the d-axis of the synchronous frame is oriented to rotor flux. In accordance with the present disclosure, however, the PMSG stator current is decomposed into d-axis and q-axis components, and the exemplary controller 140 provides grid-side reactive power control by adjusting the PMSG d-axis current in conjunction with maintaining the q-axis current unchanged in the case of non-salient PMSG (so that the d-axis current adjustment has no effect on speed/torque control), limiting the magnitude of the PMSG current within its limitation value (e.g. rated value), and ensuring that the PMSG voltage does not exceeds its rated value. In the case of salient PMSG, when adjusting the d-axis current, the q-axis current in one embodiment is regulated accordingly to maintain the torque unchanged and one or more current constraints may also apply. The inventors have found, moreover, that the adjustment range of the PMSG d-axis current changes with the PMSG speed and that this novel technique may be successfully employed to achieve unity or near-unity grid-side power factor in wide range and lagging power factor operation is also possible at low speed because of large adjustment range of the d-axis current. Further in this regard, the grid-side power factor can be regulated by either positive or negative d-axis current, where positive d-axis adjustment may be preferred because the magnitude of positive d-axis current is smaller to achieve the expected power factor and only current constraints need to be considered in this case.

In the illustrated embodiment, a close-loop control of the grid reactive current is provided using a reference calculated according to the reactive power requirement and grid voltage level by the following equation (1):

$$i^*_{grid\_re} = \frac{Q_{ref}}{1.5 \, V_{grid}}, \tag{1}$$

Where $V_{grid}$ is the magnitude of grid voltage, and $Q_{ref}$ is a reactive power reference determined by a supervisory system of the system 100 per requirements of a particular grid code. Thus, whereas conventional control techniques regulate the synchronous machine d-axis current to zero, the present disclosure provides for feedback control of the PMSG d-axis current with respect to the grid reactive current needs (grid-side power factor control).

Figure 6:
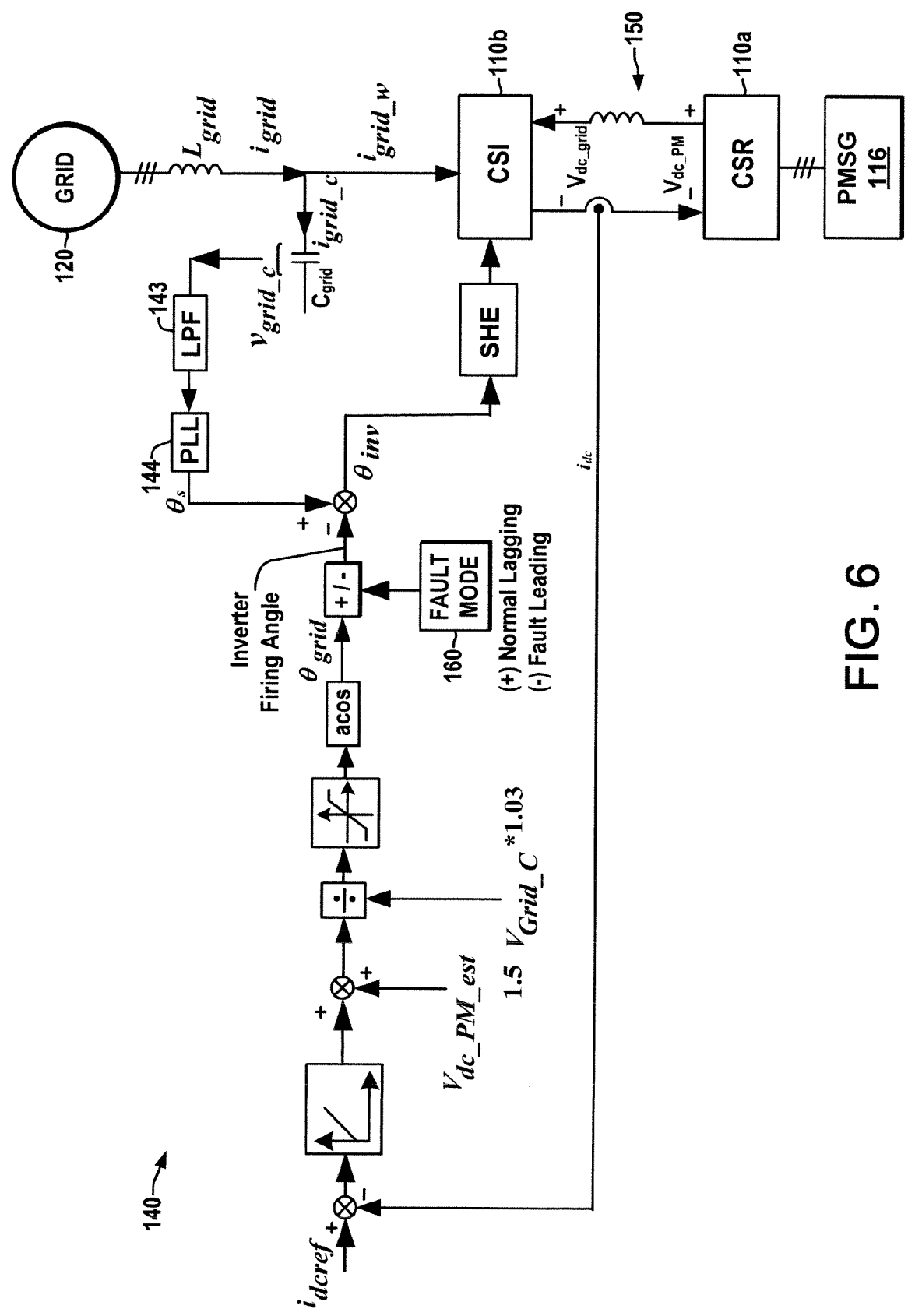
FIG. 6 is a schematic diagram illustrating further CSI control details of the exemplary switch control system in the power converter of FIGS. 1 and 2.

Referring now to FIGS. 1, 2 and 6-10, further aspects of the disclosure provide for selective leading angle control in the CSI 110b to provide reactive power control during grid fault conditions. The exemplary feedback system 118 is adapted to sense the grid voltage $V_{grid}$, and to provide a fault mode signal 160 when the grid voltage $V_{grid}$ is below a predetermined value. The grid voltage also can be estimated based on the voltage $V_{grid\_c}$ across the grid capacitor(s) $C_{grid}$ and the currents on the grid side through the exemplary feedback system 118. The switch control system 140 provides pulse width modulated CSI switching control signals with firing angle control 142b to the CSI 110b to provide output electrical power to the power grid 120, and when the fault mode signal 160 indicates a fault condition, the control system 140 provides the CSI switching control signals 142b to control the output current $i_{grid\_w}$ to be at a leading angle relative to the grid capacitor voltage $V_{grid\_c}$. FIG. 6 illustrates further CSI control details of the exemplary controller 140, in which selective harmonic elimination (SHE) type PWM switching technique with a modulation index of 1.03 is used or firing angle control, although other embodiments are possible using any suitable PWM switching techniques with firing angle control may be employed. The dc current is controlled by regulating the grid side dc voltage $V_{dc\_grid}$ in the same way as that in the phased-controlled thyristor rectifier, where the capacitor voltage $V_{grid\_c}$ is measured (FIG. 6) and filtered via a low pass filter (LPF) 143 and a phase-locked loop (PLL) 144 is used to generate the angle $\theta_s$ which is the reference angle on the grid side, and generator side dc voltage feed-forward control may be employed to improve dynamic performance for which the estimated generator-side dc voltage ($V_{dc\_PM\_est}$) instead of its actual value is usually used and an algorithm is needed and not specified here.

In normal (non-grid-fault) operation, the output current $i_{grid\_w}$ of the CSI 110b lags the voltage $V_{grid\_c}$, since the grid-side CSI converter 110b has large capacitors $C_{grid}$ which would otherwise cause leading power factor. In this manner, the CSI 110b is normally operated at lagging angles to compensate the capacitor leading current. However, when the feedback system 118 detects that a grid fault condition has ensued (by sensing/estimating a drop in the grid voltage $V_{grid}$), the controller 140 adapts the CSI control signals 142b to control the output current $I_{grid\_w}$ so as to lead the capacitor voltage $V_{grid\_c}$. This results in an increase in the amount of reactive power provided to support the grid 120 during such faults. In this regard, the WES 100 is a provider of reactive power to the grid 120, and the CSC-based system 100 advantageously support the grid voltage $V_{grid}$ during fault conditions instead of having to shut down. Thus, in the exemplary controller 140, the fault mode signal 160 selectively switches the polarity of the inverter firing angle reference $\theta_{grid}$ provided to the SHE PWM CSI control in FIG. 6, such that in normal operation lagging control is provided, and in fault conditions, leading control is provided. The inventors have appreciated that if $I_{grid\_w}$ lags $V_{grid\_c}$, the CSC 110 except the capacitor(s) draws reactive power from the grid 120 (from the capacitor $C_{grid}$), which is acceptable for power factor control during normal operation, where the total reactive current to the grid 120 is the that of the capacitor current $I_{grid\_c}$ after compensation by the CSI current $I_{grid\_w}$. However, this type of operation during low grid voltage conditions would not help to support the grid 120, where the exemplary system 140 provides for switching to leading control with $I_{grid\_w}$ leading $V_{grid\_c}$, so as to provide reactive power to the grid during fault mode.

Figure 7:
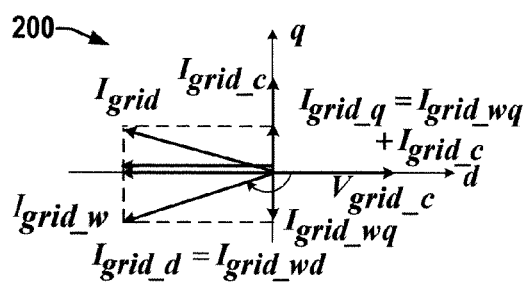
FIG. 7 is a vector diagram illustrating lagging firing angle control of the CSI in a normal operating mode of the exemplary switch control system in the power converter of FIGS. 1 and 2.
Figure 8:
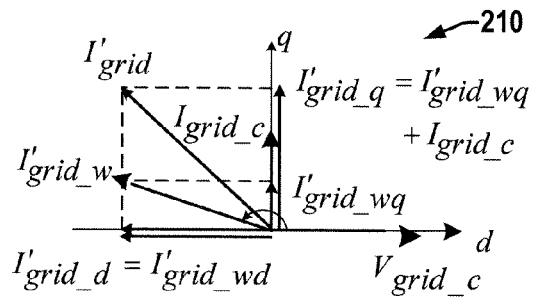
FIG. 8 is a vector diagram illustrating leading CSI firing angle control in the switch control system of FIGS. 1 and 2 in fault mode.

FIGS. 7 and 8 illustrate currents phase diagrams of these two CSI operational modes, with a diagram 200 in FIG. 7 showing lagging firing angle control of the CSI 110b in a normal operating mode and diagram 210 in FIG. 8 illustrating leading CSI firing angle control in the fault mode, where the controlled dc voltage Vdc is given by the following equations (2) in the respective normal and fault modes:

$$V_{dc\_grid} = 1.5\, V_{grid\_c} ma \cdot \cos\theta_{grid} \quad \text{Lagging Firing Angle} \quad (2)$$
$$= 1.5\, V_{grid\_c} ma \cdot \cos(-\theta_{grid}) \quad \text{Leading Firing Angle.}$$

Figure 9:
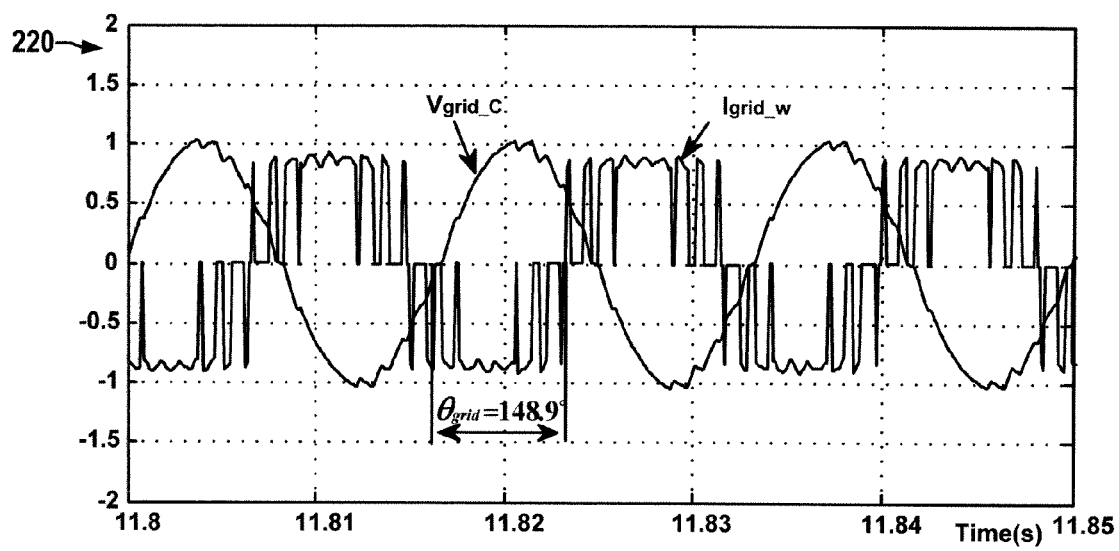
FIGS. 9 and 10 are waveform graphs illustrating normal and fault mode operation with lagging and leading firing angle control of the CSI switching signals from the switch control system of FIGS. 1 and 2.
Figure 10:
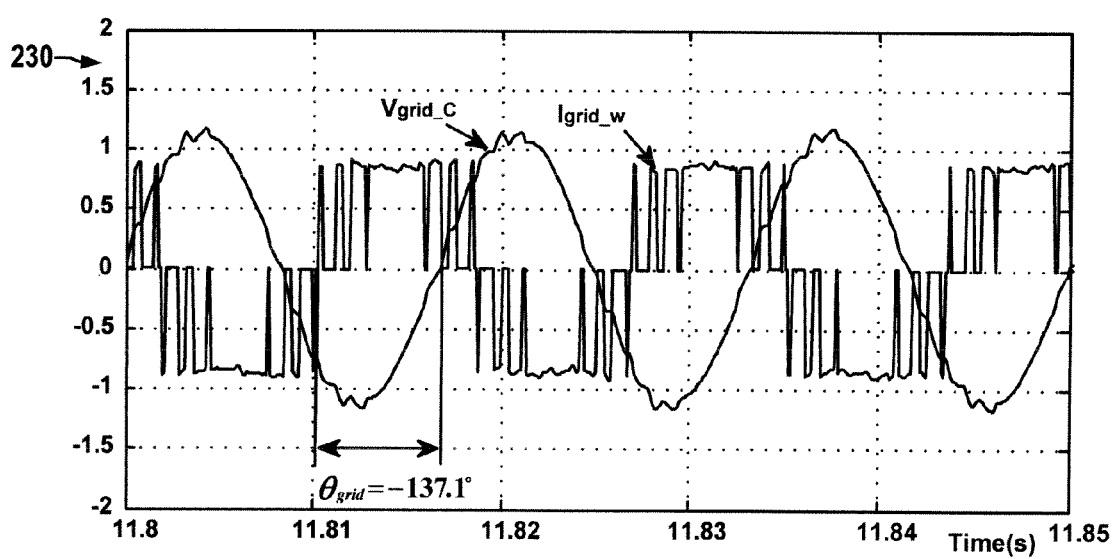

FIGS. 9 and 10 illustrate plots 220 and 230, respectively showing the exemplary grid capacitor voltages $V_{grid\_c}$ and currents $i_{grid\_w}$ when the controller 140 operates the CSI 110b in the lagging and leading modes at a PMSG speed of 1.0 pu, wherein the voltages and currents in the dc link and on the PMSG side are not affected by this dual mode operation of the CSI 110b on the grid side.

Referring now to FIGS. 11-13C, in the case of grid faults (low grid voltages), the CSC-based converter 100 may be adapted to provide more reactive power/current to the grid 120 as discussed above, and may concurrently deal with the excess energy which is generated by the PMSG 116 but which cannot be sent to the grid due to low grid voltage. In this regard, in fault mode, the energy provided by the WES 100 to the grid 120 may drop, but the energy provided to the CSC 110 by the PMSG 116 will continue (assuming the energy from the generator remains unchanged during a grid fault). Thus, absent countermeasures, the powerin/powerout condition of the CSC 110 will not be balanced during grid fault conditions, active power generated by the PMSG 116 will continue to flow into the intermediate circuit 150, and this excess power will cause the DC current in the circuit 150 to rise with the limitations of the CSI components limiting further dissipation of power to the grid.

Figure 11:
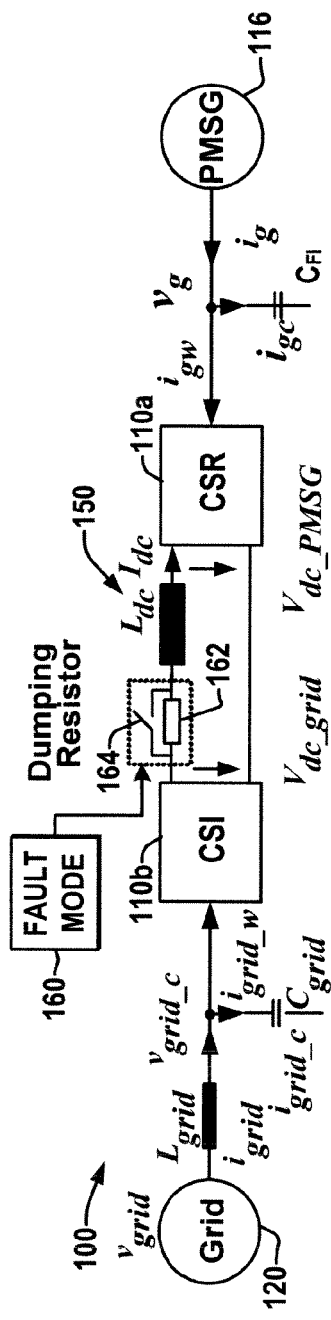
FIG. 11 is a schematic diagram illustrating an exemplary dumping resistor and fault mode operated switch in the intermediate DC link system of the power converter of FIGS. 1 and 2 in accordance with further aspects of the disclosure.
Figure 12:
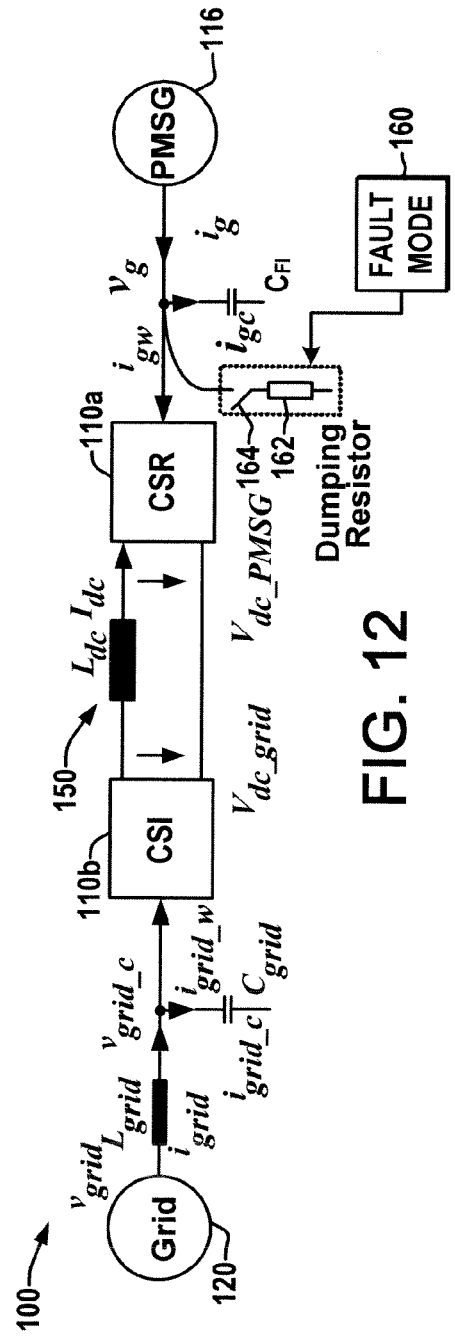
FIG. 12 is a schematic diagram illustrating an exemplary dumping resistor and fault mode operated switch at the CSR input of the power converter of FIGS. 1 and 2.
Figure 13A:
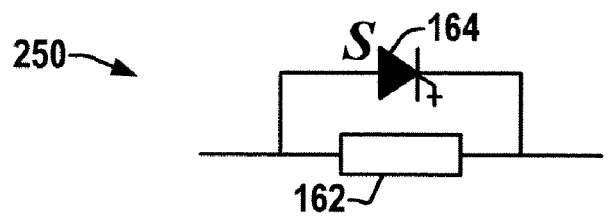
FIGS. 13A-13C are schematic diagrams illustrating various exemplar configurations of dumping resistors and parallel bypass switching configurations in the power converter of FIGS. 1 and 2.
Figure 13B:
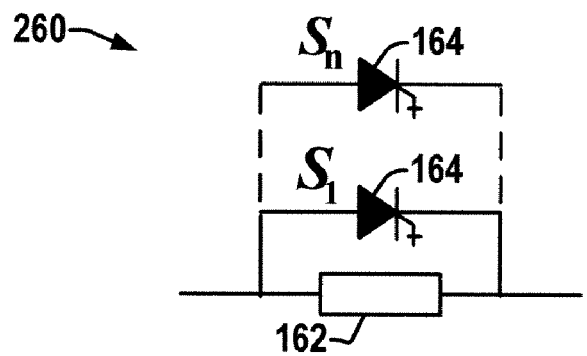
Figure 13C:
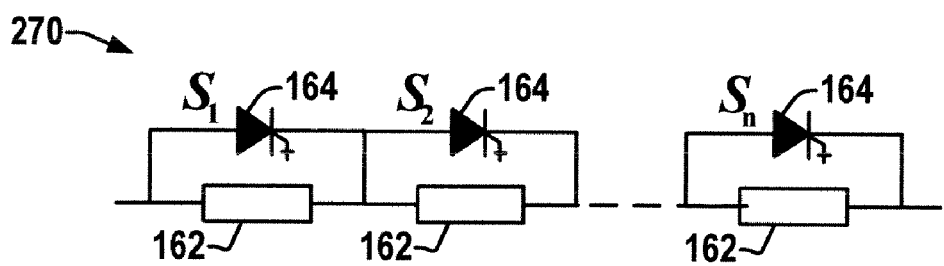

In order to prevent dc link overcurrent conditions in the intermediate circuit 150 during grid faults, further aspects of the disclosure provide one or more dumping resistors 162 and switches 164 selectively operable according to the fault mode signal 160 to couple the resistor(s) 162 to the intermediate circuit 150 and/or to the CSC input to dissipate excess power in the fault mode. One possible implementation of this aspect is depicted in FIG. 11, in which an exemplary dumping resistor 162 and a parallel-connected fault mode-operated switch 164 are provided in the upper (forward) current path of the intermediate circuit 150, with the switch 164 being closed (to bypass the dumping resistor 162) in normal mode, and with the switch opening according to the fault mode signal 160 to dissipate excess energy from the dc link 150 when the grid 120 is faulted. FIG. 12 shows another possible implementation, in which a dumping resistor 162 and series-connected switch 164 are provided across the generator-side filter capacitor CFI, wherein similar resistor/switch pairs are provided for each input phase. In this embodiment, the switch is normally open and closes during fault mode (according to the fault mode signal 160) to dissipate excess PMSG currents that cannot be accommodated by the CSC 110 when the grid 120 is faulted. More than one switch and resistor may be provided in the DC intermediate circuit 150 and/or at the phase inputs to the CSC 110, where FIGS. 13A-13C show various exemplary configurations 250, 260, and 270, respectively, of dumping resistors 162 and parallel bypass switches 164 in the power converter 100 in accordance with this aspects of the disclosure.

Figure 14:
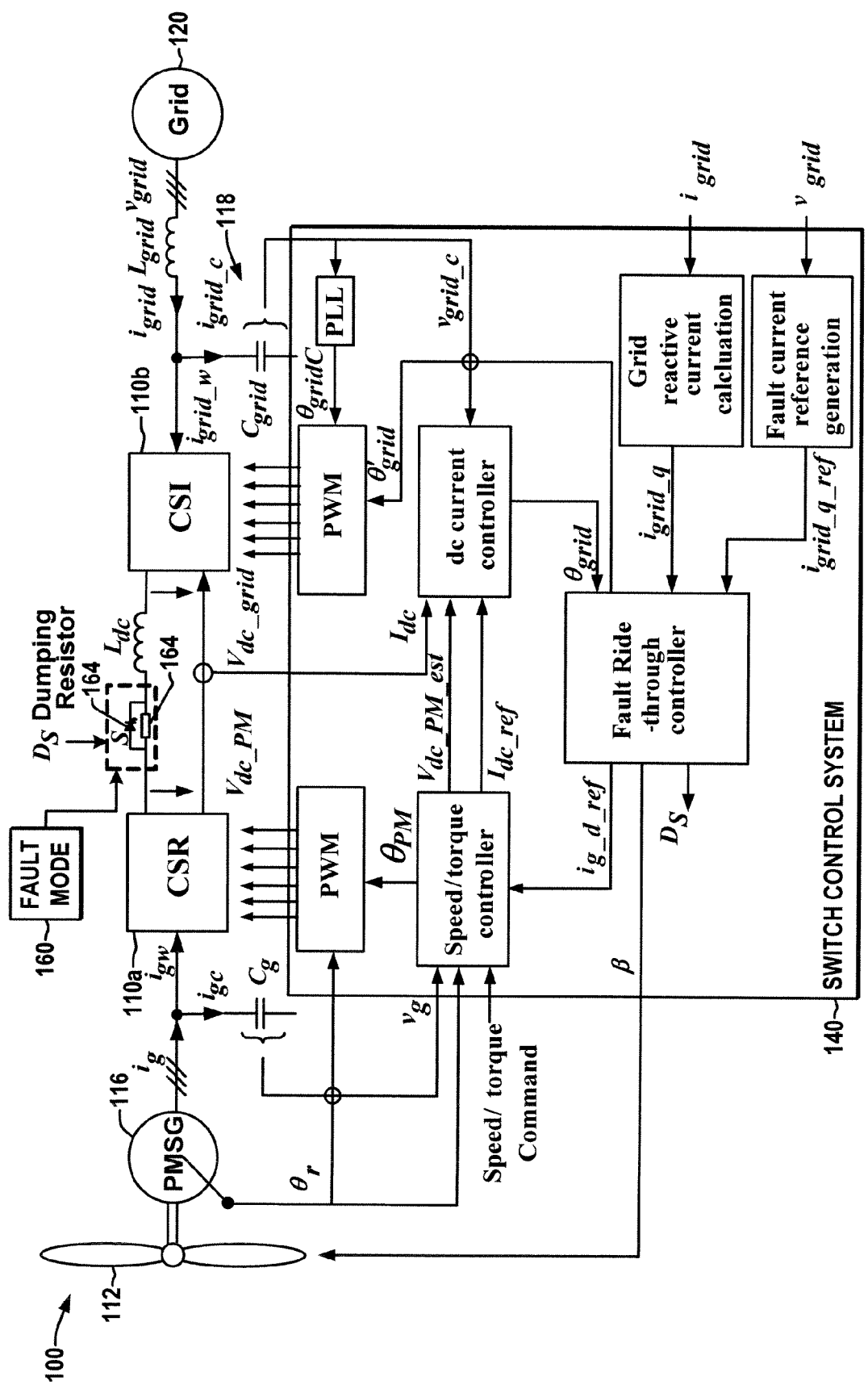
FIG. 14 is a schematic diagram illustrating further details of the exemplary switch control system in the power converter of FIGS. 1 and 2.
Figure 15:
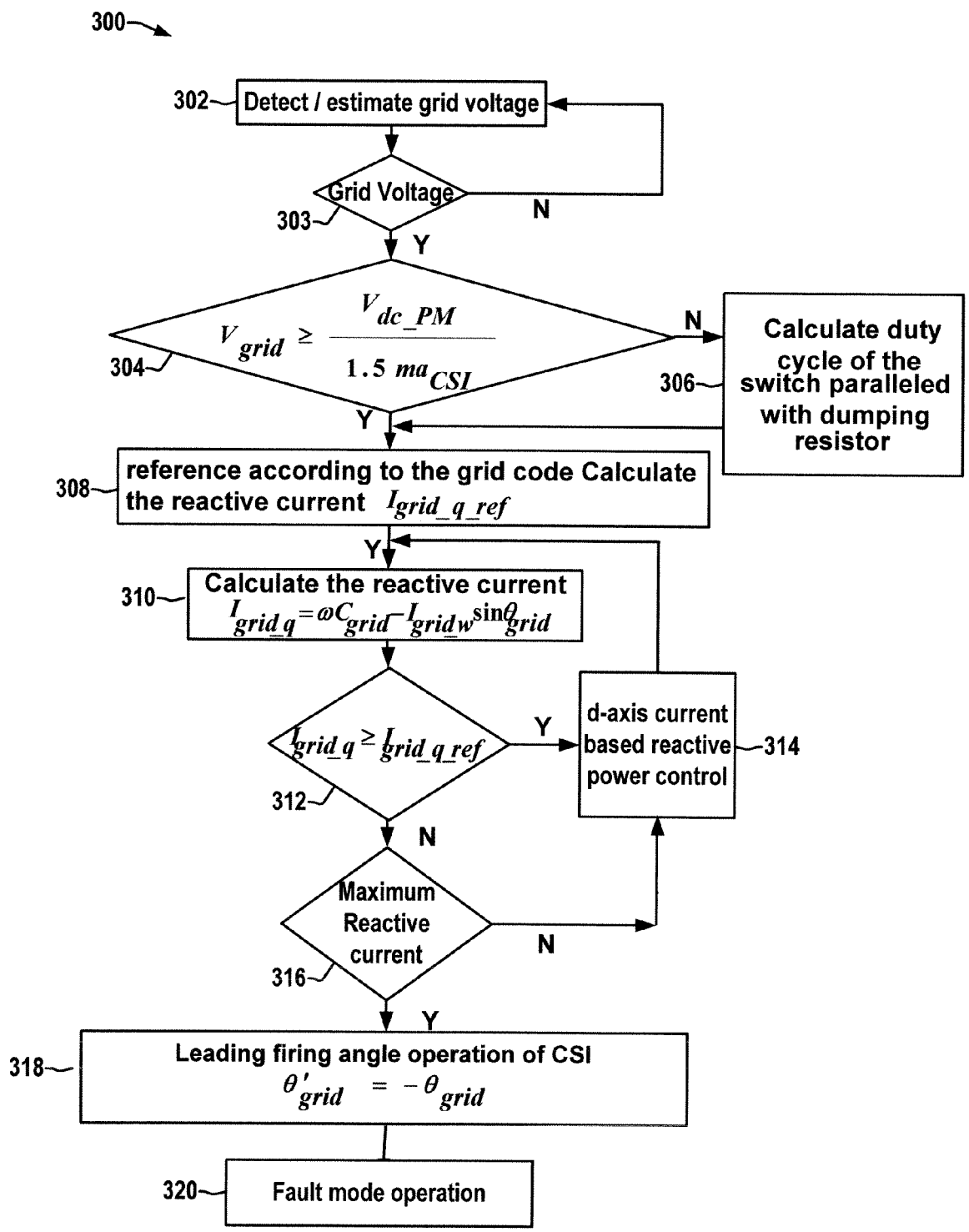
FIG. 15 is a flow diagram illustrating exemplary fault mode operation of the switch control system in the power converter of FIGS. 1 and 2.

Referring also to FIGS. 14 and 15, FIG. 14 provides a schematic illustration of an exemplary switch control system 140 in the power converter 100, and FIG. 15 illustrates a flow diagram 300 showing exemplary fault mode operation of the switch control system 140. The fault mode enablement of the dumping resistor switches 164 may be gated with/by one or more switching control signals $D_S$ from the controller 140 (FIG. 14) so as to selectively turn the switches 164 on and off in a controlled fashion during fault mode for controlled dissipation of energy. At 302 in FIG. 15, the feedback system 118 monitors the grid voltage and a determination is made at 303 as to whether a fault condition has been detected, and if so, the process 300 proceeds to 304 where the grid voltage $V_{grid}$ is compared with a threshold. If the grid voltage is low enough (N at 304), a duty cycle is calculated at 306 for the dumping resistor switches 164 (for signal $D_S$), and the dumping resistor(s) 162 is/are engaged accordingly for dissipation of excess generator energy.

At 308, the reactive current reference $I_{grid\_q\_ref}$ is calculated in the controller 140, for example, according to one or more requirements of a particular grid code and the reactive current $I_{grid\_q}$ is calculated based on the measure signals at 310, and these are compared at 312. If the reference current is the smaller (Y at 312), d-axis current based reactive power control is employed at 314 and the process 300 returns to 310. This repeats until the reference current $I_{grid\_q\_ref}$ exceeds the reactive current $I_{grid\_q}$ (N at 312), whereupon a determination is made at 316 as to whether the maximum reactive current has been exceeded. If not, the process 300 returns again to employ d-axis current based reactive power control as described above. If the maximum reactive current has been exceeded (Y at 316), the above-described leading firing angle CSI control begins at 318 (e.g., the fault mode signal 160 changes the angle polarity in FIG. 6 above), and the process 300 proceeds to the above described fault mode processing at 320.

In the fault mode at 320, any combinations of the above methods may be employed to achieve or attempt to achieve reactive current control to fulfill the requirement in the particular grid code. Furthermore, the regulation of q-axis current of the generator may be employed to extend the adjustment range of d-axis current. Pitch angle control (β) of the blade may also be enabled to avoid the overspeed of wind turbine (FIG. 14).

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A current source converter for converting input electrical power to output electrical power, comprising:
   an input for receiving input electrical power from a synchronous machine;
   an output for providing output electrical power to a power grid;
   an intermediate circuit with at least one storage element;
   a current source rectifier (CSR) comprising a plurality of switching devices coupled with the input and the intermediate circuit and operative according to a plurality of CSR switching control signals to selectively couple the input to the intermediate circuit;
   a current source inverter (CSI) comprising a plurality of switching devices coupled with the intermediate circuit and the output and operative according to a plurality of CSI switching control signals to selectively couple the intermediate circuit to the output;
   a feedback system operatively coupled with the output and providing at least one feedback value or signal indicative of one or more electrical conditions at the output; and
   a switch control system operatively coupled with the feedback system and with the CSR to provide pulse width modulated firing angle control CSR switching control signals to the CSR to convert input power from the synchronous machine to intermediate DC in the intermediate circuit, with the switch control system providing the CSR switching control signals to selectively adjust a d-axis current of the synchronous machine to regulate power factor of the output according to the at least one feedback value or signal.

2. The current source converter of claim 1 wherein the synchronous machine is driven by a wind turbine.

3. The current source converter of claim 1, the switch control system being operatively coupled with the CSI to provide firing angle control pulse width modulated CSI switching control signals to the CSI to provide output electrical power to the power grid, the feedback system being operative to sense a grid voltage and to provide a fault mode signal when the grid voltage is below a predetermined value, the switch control system being selectively operable according to the fault mode signal to provide the CSI switching control signals to control an output current to be at a leading angle relative to the grid voltage in a fault mode.

4. The current source converter of claim 3, further comprising:
   at least one resistor; and
   at least one switch selectively operable according to the fault mode signal to couple the at least one resistor to one of the intermediate circuit and the input to dissipate excess power in the fault mode.

5. The current source converter of claim 1, the feedback system being operative to sense a grid voltage and to provide a fault mode signal when the grid voltage is below a predetermined value, further comprising:
   at least one resistor; and
   at least one switch selectively operable according to the fault mode signal to couple the at least one resistor to one of the intermediate circuit and the input to dissipate excess power in the fault mode.

6. The current source converter of claim 5, comprising a plurality of resistors, the at least one switch selectively operable according to the fault mode signal to couple the plurality of resistors to one of the intermediate circuit and the input to dissipate excess power in the fault mode.

7. The current source converter of claim 6, comprising a plurality of switches selectively operable according to the fault mode signal to couple the at least one resistor to one of the intermediate circuit and the input to dissipate excess power in the fault mode.

8. A power conversion system for providing electrical power to a power grid, comprising:
   a synchronous machine with a rotor adapted to be driven by a prime mover and a generator output providing multiphase electrical output power when the rotor is driven; and
   a current source converter for converting input electrical power to output electrical power, comprising:
      an input operatively coupled with the generator output of the synchronous machine to receive input electrical power from the generator output;
      an output for providing output electrical power to a power grid;
      an intermediate circuit with at least one storage element;

a current source rectifier (CSR) comprising a plurality of switching devices coupled with the input and the intermediate circuit and operative according to a plurality of CSR switching control signals to selectively couple the input to the intermediate circuit;

a current source inverter (CSI) comprising a plurality of switching devices coupled with the intermediate circuit and the output and operative according to a plurality of CSI switching control signals to selectively couple the intermediate circuit to the output;

a feedback system operatively coupled with the output and providing at least one feedback value or signal indicative of one or more electrical conditions at the output; and a switch control system operatively coupled with the feedback system and with the CSR to provide pulse width modulated CSR switching control signals with firing angle control to the CSR to convert input power from the synchronous machine to intermediate DC in the intermediate circuit, with the switch control system providing the CSR switching control signals to selectively adjust a d-axis current of the synchronous machine to regulate power factor of the output according to the at least one feedback value or signal.

9. The power conversion system of claim 8, wherein the synchronous machine is driven by a wind turbine.

10. The power conversion system of claim 8, the synchronous machine being a permanent magnet synchronous generator (PMSG) having a permanent magnet rotor.

11. The power conversion system of claim 8, the synchronous machine having electrically excited rotor windings.

12. The power conversion system of claim 8, the switch control system being operatively coupled with the CSI to provide pulse width modulated CSI switching control signals with firing angle control to the CSI to provide output electrical power to the grid, the feedback system being operative to sense a grid voltage and to provide a fault mode signal when the grid voltage is below a predetermined value, the switch control system being selectively operable according to the fault mode signal to provide the CSI switching control signals to control an output current to be at a leading angle relative to the grid voltage in a fault mode.

13. The power conversion system of claim 8, the feedback system being operative to sense a grid voltage and to provide a fault mode signal when the grid voltage is below a predetermined value, further comprising:
at least one resistor, and
at least one switch selectively operable according to the fault mode signal to couple the at least one resistor to one of the intermediate circuit and the input to dissipate excess power in the fault mode.

14. A current source converter for converting input electrical power to output electrical power, comprising:
an input for receiving input electrical power from a synchronous machine;
an output for providing output electrical power to a power grid;
an intermediate circuit with at least one storage element;
a current source rectifier (CSR) comprising a plurality of switching devices coupled with the input and the intermediate circuit and operative according to a plurality of CSR switching control signals to selectively couple the input to the intermediate circuit;
a current source inverter (CSI) comprising a plurality of switching devices coupled with the intermediate circuit and the output and operative according to a plurality of CSI switching control signals to selectively couple the intermediate circuit to the output;
a feedback system operatively coupled with the output and providing at least one feedback value or signal indicative of one or more electrical conditions at the output, the feedback system being operative to sense a grid voltage and to provide a fault mode signal when the grid voltage is below a predetermined value;
a switch control system operatively coupled with the feedback system and with the CSR to provide pulse width modulated CSR switching control signals with firing angle control to the CSR to convert input power from the synchronous machine to intermediate DC in the intermediate circuit, the switch control system being operatively coupled with the CSI to provide pulse width modulated CSI switching control signals with firing angle control to the CSI to provide output electrical power to the grid;
at least one resistor; and
at least one switch selectively operable according to the fault mode signal to couple the at least one resistor to one of the intermediate circuit and the input to dissipate excess power in the fault mode.

15. The current source converter of claim 14, comprising a plurality of resistors, the at least one switch selectively operable according to the fault mode signal 160 to couple the plurality of resistors to at least one of the intermediate circuit and the input to dissipate excess power in the fault mode.

16. The current source converter of claim 15, comprising a plurality of switches selectively operable according to the fault mode signal to couple the plurality of resistors to at least one of the intermediate circuit and the input to dissipate excess power in the fault mode.

17. The current source converter of claim 14, comprising a plurality of switches selectively operable according to the fault mode signal to couple the at least one resistor to one of the intermediate circuit and the input to dissipate excess power in the fault mode.

18. A power conversion system for providing electrical power to a power grid, comprising:
a synchronous machine with a rotor adapted to be driven by a prime mover and a generator output providing multiphase electrical output power when the rotor is driven; and
a current source converter for converting input electrical power to output electrical power, comprising:
an input for receiving input electrical power from a synchronous machine;
an output for providing output electrical power to a power grid;
an intermediate circuit with at least one storage element;
a current source rectifier (CSR) comprising a plurality of switching devices coupled with the input and the intermediate circuit and operative according to a plurality of CSR switching control signals to selectively couple the input to the intermediate circuit;
a current source inverter (CSI) comprising a plurality of switching devices coupled with the intermediate circuit and the output and operative according to a plurality of CSI switching control signals to selectively couple the intermediate circuit to the output;
a feedback system operatively coupled with the output and providing at least one feedback value or signal indicative of one or more electrical conditions at the output, the feedback system being operative to sense a grid voltage and to provide a fault mode signal when the grid voltage is below a predetermined value, a switch control system operatively coupled with the feedback system and with the CSR to provide pulse width modulated CSR switching control signals with firing angle control to the CSR to convert input power from the synchronous machine to intermediate DC in the intermediate circuit, the switch control system being operatively coupled with the CSI to provide pulse width modulated CSI switching control signals with firing angle control to the CSI to provide output electrical power to the grid;

at least one resistor; and at least one switch selectively operable according to the fault mode signal to couple the at least one resistor to one of the intermediate circuit and the input to dissipate excess power in the fault mode.

19. The power conversion system of claim 18, the synchronous machine being a permanent magnet synchronous generator (PMSG) having a permanent magnet rotor.

20. A current source converter (CSC) based motor drive, comprising:

an input for receiving input electrical power from a grid;

an output for providing output electrical power to a synchronous motor;

an intermediate circuit with at least one storage element;

a current source rectifier (CSR) comprising a plurality of switching devices coupled with the input and the intermediate circuit and operative according to a plurality of CSR switching control signals to selectively couple the input to the intermediate circuit;

a current source inverter (CSI) comprising a plurality of switching devices coupled with the intermediate circuit and the output and operative according to a plurality of CSI switching control signals to selectively couple the intermediate circuit to the output;

a feedback system operatively coupled with the output and providing at least one feedback value or signal indicative of one or more electrical conditions at the input; and a switch control system operatively coupled with the feedback system and with the CSR to provide pulse width modulated CSR switching control signals with firing angle control to the CSR to convert input power from the grid to intermediate DC in the intermediate circuit, the switch control system being further operatively coupled with the CSI to provide pulse width modulated CSI switching control signals with firing angle control to the CSI to provide output electrical power to the synchronous motor, with the switch control system providing the CSI switching control signals to selectively adjust a d-axis current of the synchronous motor to regulate power factor of the input according to the at least one feedback value or signal.

21. The motor drive of claim 20, the switch control system being selectively operable to provide the CSR switching control signals to control an input current to be at a leading angle relative to the grid voltage.

22. The motor drive of claim 20, further comprising:

at least one resistor; and at least one switch selectively operable to couple the at least one resistor to one of the intermediate circuit and the output to dissipate excess power.

* * * * *